March 18, 1958     F. L. RIEGER ET AL     2,826,988
PIN-TICKET MARKING MACHINE
Filed Jan. 10, 1955     6 Sheets-Sheet 1

INVENTORS.
Frederic L. Rieger.
BY Paul H. Hamisch.
Wood, Herron & Evans.
ATTORNEYS.

March 18, 1958 F. L. RIEGER ET AL 2,826,988
PIN-TICKET MARKING MACHINE
Filed Jan. 10, 1955 6 Sheets-Sheet 2
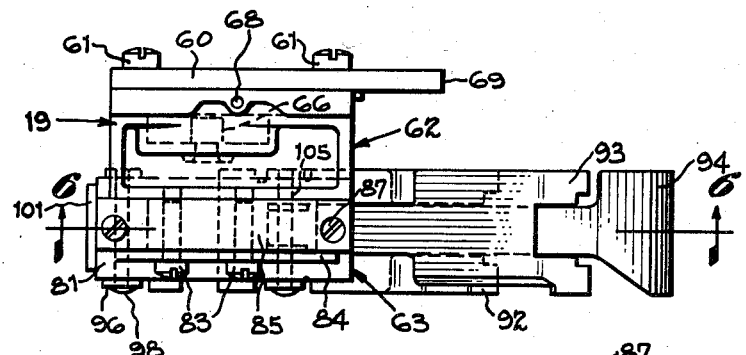
Fig. 2
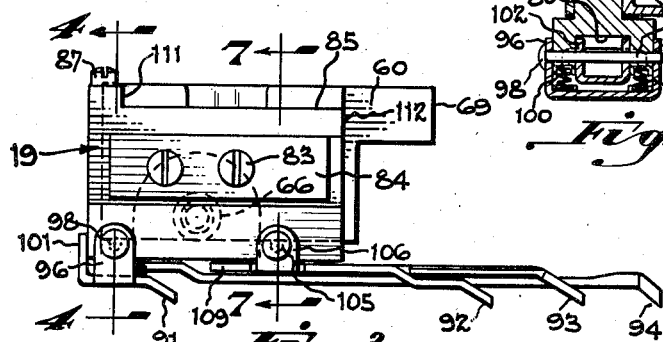
Fig. 3
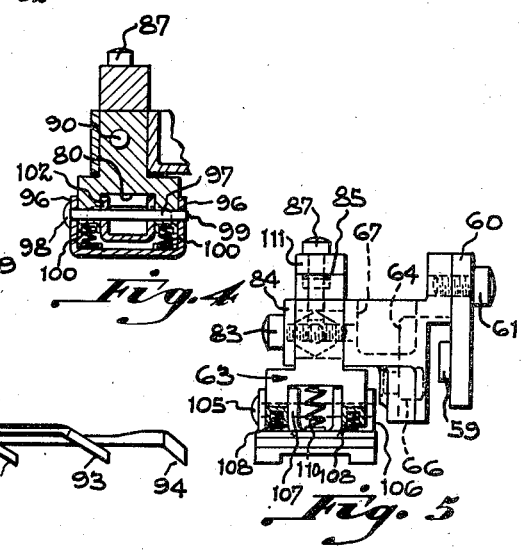
Fig. 4
Fig. 5
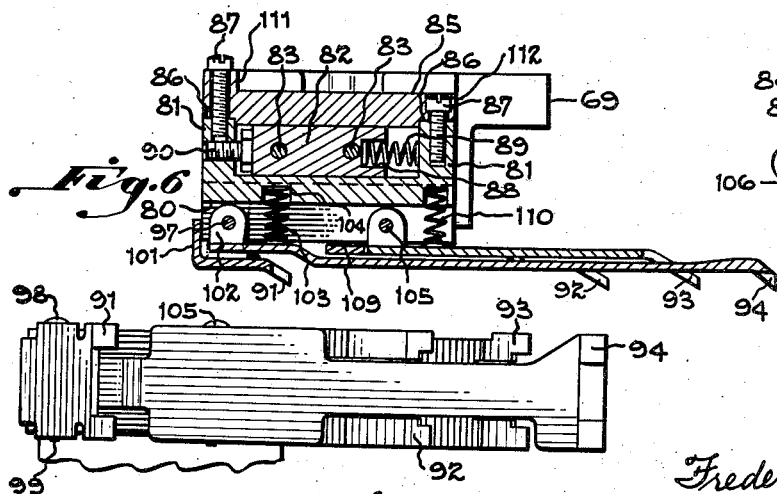
Fig. 6
Fig. 8
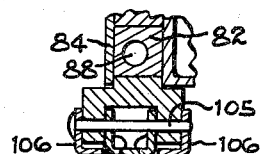
Fig. 7
INVENTORS.
Frederic L. Rieger.
BY Paul H. Hamisch.
Wood, Herron & Evans.
ATTORNEYS.

March 18, 1958 F. L. RIEGER ET AL 2,826,988
PIN-TICKET MARKING MACHINE
Filed Jan. 10, 1955 6 Sheets-Sheet 4

INVENTORS.
Frederic L. Rieger.
BY Paul H. Hamisch.
Wood, Herron & Evans.
ATTORNEYS.

March 18, 1958 F. L. RIEGER ET AL 2,826,988
PIN-TICKET MARKING MACHINE
Filed Jan. 10, 1955 6 Sheets-Sheet 6

INVENTORS.
Frederic L. Rieger.
BY Paul H. Hanisch.
Wood, Herron & Evans,
ATTORNEYS.

United States Patent Office 2,826,988
Patented Mar. 18, 1958

2,826,988

PIN-TICKET MARKING MACHINE

Frederic L. Rieger and Paul H. Hamisch, Dayton, Ohio, assignors to The Monarch Marking System Company, Dayton, Ohio, a corporation of Ohio Application January 10, 1955, Serial No. 480,704

2 Claims. (Cl. 101—291)

This invention concerns improvements in price marking machines of the type disclosed in United States Patents Nos. 2,268,406 and 2,310,179.

This type of marking machine is designed to print price indicia upon a ticket and secure the ticket to an article of merchandise by means of a straight pin which is passed through the ticket and the article. The tickets employed are provided in strip form and they are advanced through the machine by means of feed fingers which engage in notches provided in the strip between adjacent tickets. The feed fingers operate cyclically to present one ticket at a time to a platen, where each ticket, in turn, is impressed by printing type mounted in a printing head. Simultaneously with the printing of a ticket, a cut-off knife, located adjacent to the printing head, severs the impressed ticket from the strip. The severed ticket is then advanced during the next cycle of the machine to a discharge point where it is pinned to the article to be marked. In this operation the printing head functions only once in each cycle of the machine.

In a number of instances, it has been found desirable to use a multi-part ticket which carries duplicate, triplicate etc., sets of printed indicia for stock control and inventory purposes. Thus, lines of weakening, such as serrations, are provided in the ticket material between the individual parts of the ticket so that the parts may be torn from the ticket after it has been fastened to an article of merchandise. For example, a three-part ticket may be employed, one part of which is adapted to be torn off upon the receipt of an article of merchandise in a particular department of a store to serve as a record of the article being on hand in the department. Upon the sale of the article, the second part may be removed and used in the reordering of a replacement article. The third part may remain on the article to serve as identification in the event the customer returns the article to the store for exchange or for some other reason.

In the type of machine described the strip is advanced during each cycle of the machine a distance equal to the length of a complete ticket. Thus, in order for duplicate sets of indicia to be impressed upon the ticket, duplicate sets of printing type must be mounted in the printing head. This means that the operator of the machine must install one complete set of type for each part of the ticket, a time consuming and tedious job in which errors are likely to be made. In addition, the printing head must be of such a size to accommodate two or more sets of type which makes it unduly large.

The objective of the present invention is to provide means for adapting single cycle marking machines to multi-part ticket operation in which only one set of type is required to be installed in the printing head, the printing head operating the required number of times during the cycle to impress the indicia of the one set of printing type on all of the parts of the ticket. The ticket employed in the improved machine is one in which the various parts are aligned longitudinally of the ticket.

In printing a three-part ticket a cycle of operation in the improved machine proceeds as follows. At the start of the cycle a printed ticket rests upon the platen beneath the printing head. This ticket is not attached to the strip, having been severed from it at the end of the preceding cycle. The printed ticket is advanced for a distance substantially equal to its full length from beneath the printing head to the point at which it is attached to the article of merchandise by a pin. At the same time, however, the following ticket is advanced for only a portion of its length to present its first part to the printing type carried in the printing head. The second part of the ticket is then advanced onto the platen and impressed by the printing type carried in the printing head. The third part is then advanced and printed. At the same time the third part is printed, the ticket is severed from the strip and is ready to be fed from the machine in the first part of the next cycle.

It will be noted that the ticket to be printed is advanced one part at a time during the cycle, whereas the ticket already printed is advanced for its full length to discharge during the first part of the cycle. In this first part of the cycle, the printed ticket and the one following it are advanced by feed fingers which are mounted in the same carriage. The carriage must advance a full stroke in order to move the printed ticket for its full length. The arrangement of the feed fingers mounted in the carriage which makes it possible to obtain the two different types of ticket advancing operations simultaneously and by means of one carriage is one of the novel features of the invention.

Other features of novelty reside in means which are provided to drive the carriage, means which are provided to drive the printing head, and means which are provided to control the movement of the feed carriage during its operation.

Other features and advantages of the present invention will be readily apparent to those skilled in the art from the following detailed description of the drawings in which:

Figure 2 is a top plan view of the feed finger carriage which is used in the improved machine.

Figure 3 is a side elevational view of the carriage shown in Figure 2.

Figure 4 is a fragmentary cross sectional view taken on the line 4—4 of Figure 3.

Figure 5 is an end elevational view of the carriage shown in Figures 2 and 3 with parts broken away to show details of construction.

Figure 6 is a cross sectional view taken on the line 6—6 in Figure 2.

Figure 7 is a fragmentary cross sectional view taken on the line 7—7 in Figure 3.

Figure 8 is a bottom plan view of the carriage shown in Figures 2–7.

Figure 1:
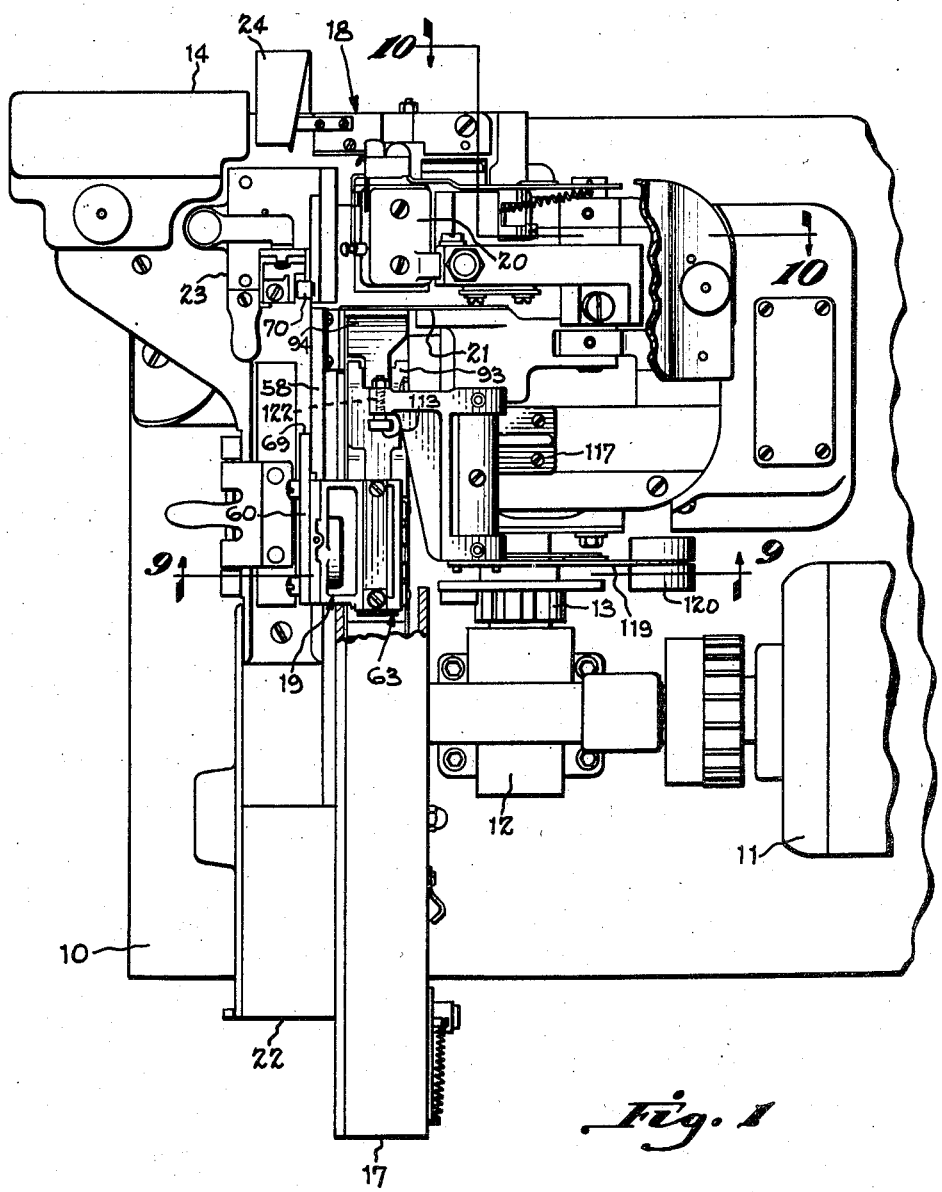
Figure 1 is a fragmentary plan view of a pin-ticket marking machine embodying the principles of the present invention. In this view some of the parts are broken away to show details of construction.

For a general understanding of the operation and construction of the type machine to which the improvements of the present invention are applicable attention is directed to the two patents which have been previously noted. Only the pertinent parts are shown in detail in the present disclosure. In Figure 1, a base is indicated at 10; an electric motor, which is mounted on the base, is indicated at 11; and, a gear box is indicated at 12. The gear box is designed to reduce the speed of the motor and turn the drive through right angles, from the axis of the motor, which is crosswise of the base to the axis of a one-cycle clutch 13, which is arranged to rotate about an axis extending from the front to the back of the machine. Generally, a main drive shaft, to be identified later, extends forwardly from the clutch 13 to the front of the machine. This shaft, being coupled to the motor by the clutch 13, rotates only once during each cycle of operation of the machine. Thus, elements which operate only once during each cycle, such as the pinning mechanism located beneath a removable housing 14 may be driven directly from it. In the machine illustrated in the drawings the ticket is impressed with three identical sets of printed indicia during each cycle. To accomplish this a second shaft, to be identified later, is geared to the main drive shaft to rotate in the ratio of three to one with respect to it. Therefore, one of the differences in the structure of the present machine with respect to the type shown in the patents is the provision of means, including the second drive shaft, to step up the operations of certain of the elements of the machine so that they function repeatedly during the one cycle of operation.

Although the printing mechanism, which repeats the printing on the ticket, is the element in the combination which directly achieves the end sought, it will be obvious that its operation is dependent upon the operation of the means which are provided to advance the tickets for printing. In fact, providing means to feed the tickets in timed sequence and in synchronization with the printing means constituted the most serious and troublesome problem to overcome in the adaption of a single cycle machine to the operation provided here.

In general, the tickets operated upon in the present machine are provided in strip form, a fragment of such a strip being designated 15, with the individual tickets in the strip being designated 16. The strip of tickets is wound upon a reel which is enclosed within a housing shown in Figure 1 at 17. The strip unwinds from the reel and is fed across the machine from back to front toward the discharge point indicated generally at 18, where the tickets are pinned to articles of merchandise. The strip is advanced by a feed finger carriage 19 and the individual tickets are impressed by a printing head 20. The tickets are separated from the strip by means of a cut-off knife 21 which is located at the side of the printing head away from the discharge point.

The pins conventionally used to affix the tickets to merchandise are also provided in strip form. The individual pins are carried by a paper web (not shown) which is mounted on a reel within a housing 22. The web carrying the tickets moves through the machine from back to front, paralleling the movement of the ticket strip. The pin web is advanced by a feed means 23. The pins are removed from the web by mechanism of known construction located beneath housing 14. The web, with the pins removed, is discharged from the machine at the chute 24. Counterparts of the elements of the machine which have been described in a general way may be found in the disclosures of the two patents. The novel elements of the improved machine disclosed here will be described specifically under separate heading and then their operating relationships described in detail.

*Printing mechanism*

Price marking indicia is printed upon the tickets by means of removable type which is shown generally at 25 in the drawings. This type is placed in a chase 26 and the chase inserted into the printing head 20. The type, chase and head may be of conventional construction. The type is inked after each impression upon a ticket by an ink pad 27 which transfers ink from a reservoir 28 and which deposits it on the printing surfaces of the type. The elements of the inking system are disclosed in copending patent application Serial No. 320,768, filed November 15, 1952, now U. S. Patent No. 2,756,674 which application also shows construction details of the printing head.

The printing head is mounted for reciprocating, swinging movement about a pivot pin 30 which is journalled in the frame of the machine. An arm 31 depending from the printing head connects it to drive means which are located inside of the machine. The connection is made through an L-shaped connector 32 which is disposed with one arm substantially horizontal and the other arm substantially vertical. The outer end of the first arm of the L-shaped connector is pivotally attached to arm 31 of the printing head by means of a pin 33. The opposite end of the connector, at the lower end of the vertical arm thereof, is pivotally connected as at 34 to a link 35. The lower end of the latter link is pivotally affixed to the base by means of a pin such as the one shown at 36. The vertically disposed arm of the L-shaped connector 32 has a cam roller 37 affixed to it above the pivot connection 34. This cam roller is arranged to ride in a cam groove 38 which is cut into the rear face of a cam disk designated 39. It will be noted from Figure 10 that the cam disk 39 is driven by means of a train of gears and is powered from the main drive shaft 40 of the machine which rotates once during each cycle of the machine. The gear train includes a gear 41 keyed to shaft 40, a small idler gear 42 which meshes with gear 41, a large idler gear 43 which is pinned to gear 42 and a small pinion 44 which is keyed to cam disk 39 and which is meshed with large idler 43. The gear train serves to drive the cam roller at a ratio of three to one, relative to shaft 40 so that the elements, including the printing head which are driven from the cam disk operate three times during each cycle of the machine.

Figure 10:
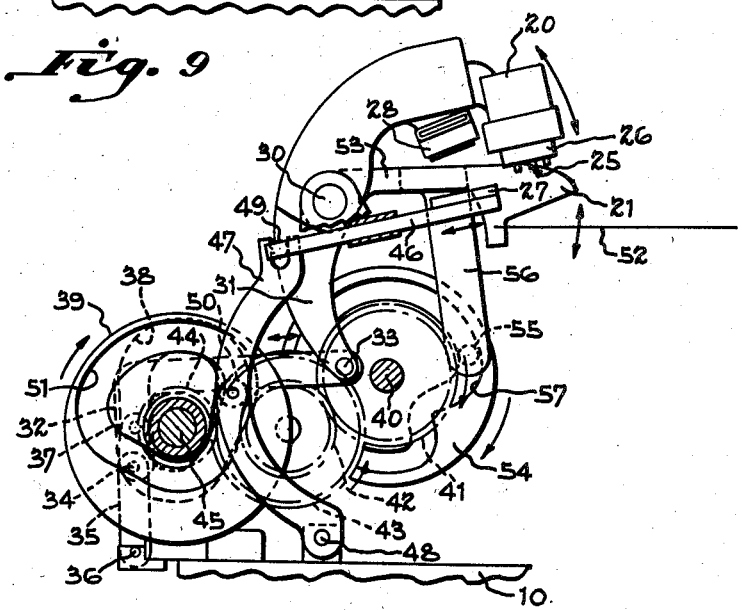
Figure 10 is a semi-diagrammatic cross sectional view showing the drive for the printing head, the inking mechanism of the printing head and the cut-off knife.

The cam disk 39 and pinion 44 are rotatably journalled upon the "second shaft," now identified 45 in Figure 10, to which reference has been previously made. The location of the cam roller 37 on the side of shaft 45 which is opposite to the pivotal connection 33 between the L-shaped connector and the depending arm 31 of the printing head results in a substantially horizontal reciprocating motion for the long, horizontal arm of the L-shaped connector. Due to the shape of the printing head and the pivotal connection at 30 the motion of the printing head which results in a swinging up and down reciprocating movement. The cam track 38 is so shaped that the head raises and lowers twice each time that an impression is made. One of these movements is longer than the other and brings the type 25 into contact with the ticket being printed. The other movement is a lesser one, and lowers the type into contact with the ink transfer pad 27.

The ink transfer pad 27 is mounted at the outer end of a slidably mounted carrier bar 46. This bar is driven by means of an actuating lever 47. The lower end of the lever is pivotally journalled as at 48 to the base of the machine. The upper end of lever 47 is bifurcated and attached to the carrier bar 46 by means of a pin 49. A cam roller 50 is mounted near the middle of the actuating lever 47. This roller is positioned to ride in a cam track 51 which is cut into the face of cam disk 39 at the side opposite the printing head cam track 38. The two cam tracks 38 and 51 are so interrelated that the operation of the printing head proceeds as follows. From the position of the head shown in Figure 10 the printing head may descend to impress a ticket disposed upon the line designated 52 in Figure 10. At the same time it will be noted that the ink transfer pad 27, being positioned beneath ink reservoir 28 is contacted by the ink reservoir. This is a full stroke of the printing head. The next time the printing head descends, which is in a lesser amount, the carrier bar 46 has been extended to place the ink transfer pad in the path of the type 25 in the printing head so that the film of ink previously picked up from the ink reservoir is transferred onto the type.

Cut-off knife 21 is mounted at the outer end of an arm 53 which is pivoted on the pin 30 which journals the printing head. In a three-part operation, wherein a ticket is impressed with triplicate sets of marking indicia during one cycle of the machine, the cut-off knife is arranged to descend simultaneously with the printing head when the printing head makes the third impression to complete the ticket. The cut-off knife is driven by a cam disk 54 which is keyed to shaft 40 to make one revolution per cycle of the machine. A cam roller 55, carried at the lower end of an arm 56, which is attached to the arm 53 upon which the cut-off knife is mounted, actuates the cut-off knife. The cam roller rides in a cam groove 57 which is cut into the outer face of the cam disk 54. The shape of the cam groove is such to cause the cut-off knife to descend once per revolution of shaft 40, its descent being related to cam groove 38 such that the descent coincides with the third major descent of the printing head as pointed out above.

For further details of the construction and operation of the inking mechanism and of the printing head itself reference is made to the copending application mentioned above.

*Feeding mechanism*

The feed finger carriage 19 is mounted for sliding, reciprocating movement upon a guide rail 58 which parallels the path of movement of the ticket strip through the machine. This rail may be formed from straight bar stock material having a groove cut in the side thereof opposite the side adjacent to the path of the ticket strips. This groove, not shown, accommodates a slide block or shoe 59 (Figure 5) which is secured to the inner face of a latch plate 60. The latch plate is fastened to the body of the carriage by means of a bolt 61 and depends along the outer face of the rail 58 to secure the carriage in place upon the rail. The construction of the rail 58 and the means for securing the latch plate are conventional and are not related specifically to the improvements of the present invention, it being apparent that other means may be provided to fasten the carriage. The feed finger carriage is made in two parts which are movable relative to one another. One of these parts is designated generally by the numeral 62 and will be referred to as the carriage "mount." The other part is designated generally at 63 and will be referred to as the carriage "body." The mount 62 carries the latch plate 60 and it is configured along one side to engage upon the guide rail 58. In addition, the underside of mount 62 has a semi-circular groove 64 therein which is adapted to receive the upper end of an actuating lever, indicated generally at 65, by means of which the feed finger carriage is driven. The upper end of lever 65 is bifurcated and adapted to engage a pin 66 which resides within the semi-circular groove 64.

Figure 19:
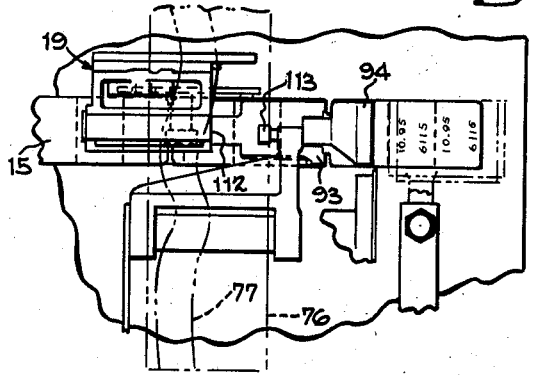
Figure 19 is a view similar to Figure 15 showing the feed finger carriage in retracted position during the printing of the second part of the ticket.
Figure 20:
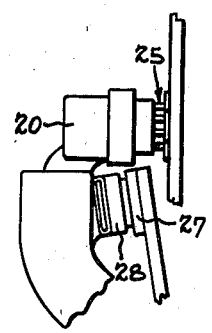
Figure 20 shows a printing head and inking mechanism in the positions of Figure 19.

The upper portion of the mount may be hollowed out as shown at 67 to save metal and to decrease its weight. Also an oil hole such as the one shown at 68 may be provided for applying lubricant to the guide rail 58 upon which the mount slides. Latch plate 60 may include a striker 69 which extends forwardly from the upper end thereof. This striker is designed to engage an actuator 70 for the pin feed mechanism designated 23 to index the pin web when the feed finger carriage is at the foremost end of its travel. As a production expediency, actuating lever 65 may be made in two parts. See Figure 9. The part which actually engages in the semi-circular groove 64 in the mount may be formed from bar stock as shown at 71. The lower part of the lever may be of case construction as shown at 72, the two parts being bolted together as shown at 73. The lower end of the actuator has an elongated journal 74 extending at right angles thereto. The journal receives a shaft (not shown) which is pivotally mounted in a bracket 75 which may be formed as an integral part of the base of the machine. Journal 74 permits the actuating lever 65 to be swung back and forth in a plane which parallels the axis of main drive shaft 40. Movement is imparted to the actuating lever by means of a cylindrical cam 76 having a cam groove 77 formed therein. A cam roller 78, mounted upon the actuating lever 65 is engaged in the groove 77. The shape of cam groove 77 is shown diagrammatically in the odd numbered figures starting with Figure 11 and going through Figure 19. Essentially, the cam groove is configurated to provide a full stroke for the feed finger carriage in the first part of a cycle, followed by two shorter strokes.

The upper part of the carriage body is comparatively narrow as viewed from an end, whereas the lower part thereof is substantially wider and has a rectangular channel 80 cut in its underside which extends from one end to the other of the body. The upper portion of the body is hollow between two end pillars which are indicated at 81—81 respectively. The two pillars are rectangular in cross section and are flat at the top. The hollow center of the carriage block receives a rectangular slide block 82 which is formed as an integral part of mount 62. An examination of Figure 6 will show that the slide block 82 is substantially shorter from front to back than the distance between the two pillars 81—81. The slide block 82 has two holes which are frilled therein and which are tapped to receive a pair of bolts 83—83. These bolts secure a keeper plate 84 to the inner face of the block, which keeper plate is substantially longer and wider than the hollow portion of the carriage body so as to close the side of the carriage body while still permitting relative movement between the mount and the carriage body. The upper side of the hollow interior of the carriage body is closed by means of a keeper bar 85. The underside of the respective opposite ends of this bar are machined to provide a pair of shoulders 86—86 which seat against the upper ends of pillars 81—81. The keeper bar is secured to the respective pillars by bolts 87—87 which traverse bores located respectively in the ends of bar 85, the bolts threading into tapped holes in the centers of the pillars. The forward face of the slide block 82 has a bore 88 therein which seats a coil spring 89. The forward end of this spring rests against the forward pillar 81 so that the spring is under compression between the block and pillar. Relative rearward movement of the slide block relative to the carriage body is limited by means of a hex-headed adjustment screw 90 which is threaded into the rear pillar 81.

It will be seen that within the limits provided by the compression spring 89, the mount 62 can over-travel the carriage body at the end of a forward stroke of the feed finger carriage if the carriage body comes into contact with a positive stop. As will be pointed out below, a positive forward limit of the feed finger carriage travel is important in the accurate aligning of the tickets which are advanced to the printing head. The expedient of providing relative movement or over-travel between the carriage mount and carriage body provides a simple way of adjusting the stroke of the feed finger carriage and for accurately positioning the tickets advanced by it.

Figure 26:
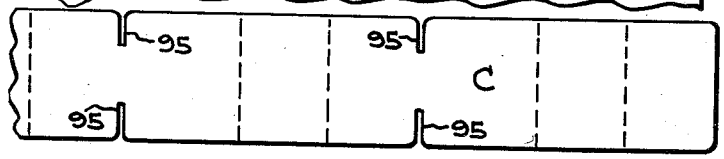
Figure 26 is a top plan view of the ticket strip under the conditions of Figure 25.

The feed finger carriage assembly mounts four feed fingers. These are designated respectively, starting at the back of the feed finger carriage and progressing toward the front 91, 92, 93 and 94. The parts of the feed fingers which make contact with the tickets are substantially identical. As shown in Figure 26 the ticket strip has a plurality of pairs of notches 95—95 cut into it. The notches of each pair extend toward one another from opposite sides of the strip between adjacent tags. These notches receive the wedge-shaped ends of the feed fingers, whereas the fingers themselves straddle the strip.

Feed finger 91, which is at the rear of the feed finger carriage, includes a pair of tabs 96—96 which are turned upwardly at 90° to the finger to reside along the respective outer sides of the lower portion of the carriage body. A pin 97 passes through both tabs and through the body 63 of the carriage to pivotally mount the finger upon the carriage. One end of the pin has a head 98 thereon whereas the opposite end 99 is swaged over to secure the pin in place. A pair of coil springs indicated at 100—100 are socketed in the underside of the carriage body. These springs are located at the respective sides of the channel 80 which extends through the central portion of the carriage body and they serve to urge the feed finger 91 downwardly so that the wedge-shaped outer ends of the finger will engage into the feed notches in the ticket strip. The rear portion of the feed finger has a flange 101 turned upwardly at 90° to provide an abutment which engages the rear of the carriage body to prevent the feed fingers from swinging around the pivot pin 97 to an extent which would unseat the two springs 100.

Feed finger 94 is also pivotally mounted upon the pin 97. The rear part of this feed finger has a pair of tabs 102—102 turned up at right angles to reside in the channel 80. Pin 97 passes through the tabs inside of the channel as shown in Figure 4. This feed finger is the longest one of the four, extending from the rear pivot to a point well beyond feed fingers 92 and 93. A coil spring 103 is provided to urge feed finger 94 downwardly. The coil spring is socketed in a bore 104 which is in the top of channel 80. The lower end of the coil spring 103 seats around means such as a pin which extends up from the rear portion of the feed finger.

Feed fingers 92 and 93 are pivoted upon a pin 105 near the forward end of the carriage body. This pin also extends through the lower portion of the body and through the channel 80. Finger 92 has tabs 106 turned upwardly at its respective sides to reside against the outside of the carriage body, whereas feed finger 93 has tabs 107 turned upwardly to reside inside of channel 80. As shown in Figure 7 the pin 105 passes through the four tabs in the same way that the pin 97 passes through the tabs of feed fingers 91 and 94. A pair of coil springs 108—108 similar to coil springs 100—100 are provided to urge feed finger 92 downwardly. A rearward extension 109 on feed finger 92 provides an abutment which engages the underside of the carriage body at the two sides of channel 80 to serve as a limit for the downward movement of this finger. Feed finger 93 is urged downwardly by means of a heavier type of spring 110 which is similar to spring 103. In general spring 103 and 110 are approximately twice as strong as the spring 108 and 100 for obvious reasons. The rearward extension 109 on finger 92 indirectly also serves to limit the downward movement of feed finger 93. It will be noted from Figure 8 that the forward portion of feed finger 93 overlies feed finger 92 so that the tendency of coil spring 110 to move finger 93 downwardly causes finger 93 to rest on top of finger 92. Thus, the limit of downward movement of finger 93 is the lowermost position of finger 92.

*Feed carriage stop*

Figure 9:
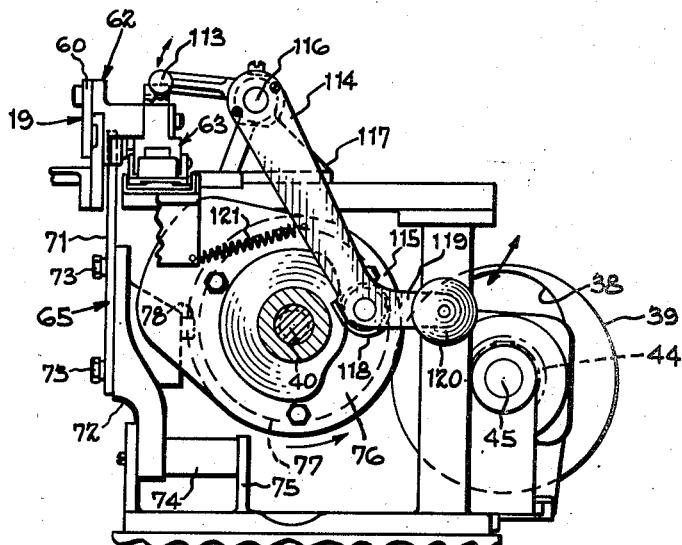
Figure 9 is a semi-diagrammatic view showing the drive for the means which controls the movement of the feed finger carriage during the part of the cycle following the advance of a completed ticket to the discharge point.

Referring again to Figure 6 which shows the keeper bar 85, it will be noted that the rear end of the keeper bar is substantially higher than the forward end thereof to provide an abutment designated 111. The forward end of the keeper bar provides a second abutment 112, the two abutments being offset vertically. Both abutments 111 and 112 serve, in conjunction with a stop, to limit the forward motion of the feed finger carriage. The stop which these abutments strike is designated 113 and it is adjustably mounted in a rocker arm assembly 114 for movement between two positions, a raised one in which it is in alignment with abutment 111 and a lowered position in which it is in alignment with abutment 112. The rocker arm is raised and lowered between these two positions by means of a cam 115 which is keyed to the main shaft 40 of the machine. The rocker arm is pivoted upon a shaft 116 journalled in a bracket 117 which is secured to the top of the machine in position to place stop 113 in the line of movement of the respective abutments 111 and 112. The lower end of the rocker arm has a cam roller 118 mounted thereon in position to ride the edge of cam 115. An extension 119 on the rocker arm beyond roller 118 carries a weight 120 which tends to swing the rocker arm into a position to elevate stop 113. In addition, a coil spring 121 is provided to urge the rocker arm in this direction. Figure 9 shows that there is one recess on cam 115 which is effective for substantially one-third of a revolution of the cam to raise the stop 113. Thus stop 113 is in raised position for substantially two-thirds of the cycle. The lower place on the cam coincides, in the operation of the machine, to the time in the cycle when the feed fingers are first advanced to move a new ticket onto the printing platen beneath the printing head.

*Operation*

Figure 11:
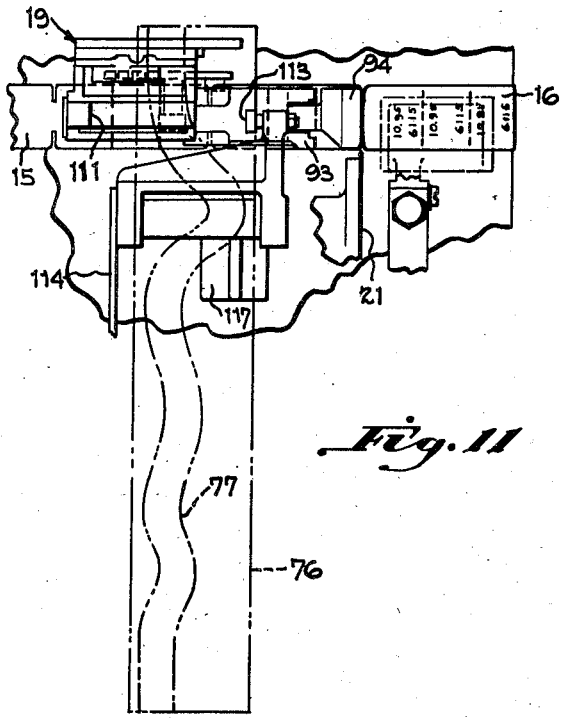
Figure 11 is a top plan view of the feed finger carriage at the start of a cycle of operation. In this view a layout of the cam track which controls the movement of the feed finger carriage is superimposed over the carriage with the part of the cam track effective at the start of a cycle being positioned on the carriage.
Figure 12:
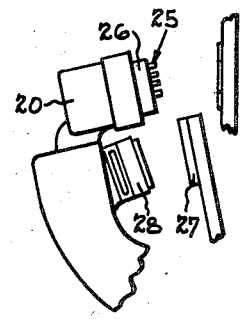
Figure 12 is a diagrammatic, fragmentary, side elevational view showing the positions of the printing head and inking mechanism relative to a ticket at the start of a cycle of operation.

At the start of a cycle the feed finger carriage is in the retracted position shown in Figures 1 and 11. At this time the printing head and cut-off knife are in elevated position and the rocker arm 114 is raised to place stop 113 in alignment with abutment 111 which is at the rear of the keeper bar 85. The first ticket advancing movement of the feed finger carriage is for a full stroke, that is, the carriage moves forward a distance substantially equal to the full length of one of the tickets in the strip. The strip is supported upon the table of the marking machine in the conventional way so that the springs which tend to urge the feed finger downwardly cause the wedge-shaped ends of the fingers to engage into the feed finger notches, when fingers and notches coincide, and ride on the table during the advancing movement. If the machine has been in use at the start of a cycle there is a ticket resting on the feed finger platen in front of feed finger 94. This ticket is free from the strip, having been cut therefrom at the end of the previous cycle. As the feed finger carriage starts forward, feed finger 94 engages the severed ticket. At this time feed fingers 91, 92 and 93 are resting on top of the tickets in the strip, fingers 92 and 93 being on top of the ticket which is to be printed in the present cycle and finger 91 resting on top of the ticket which is to be printed in the next cycle of operation.

Figure 13:
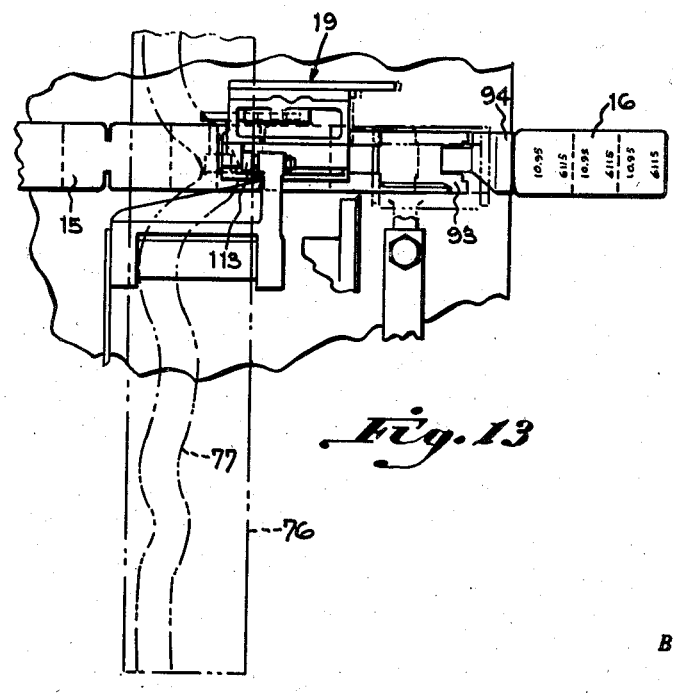
Figure 13 is a view similar to Figure 11 showing the feed finger carriage in position to discharge a printed ticket.
Figure 14:
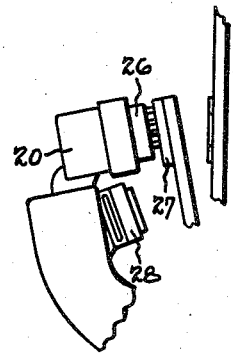
Figure 14 is a view similar to Figure 12 showing the relative positions of the printing head and inking mechanism at the time a ticket is being discharged.
Figure 21:
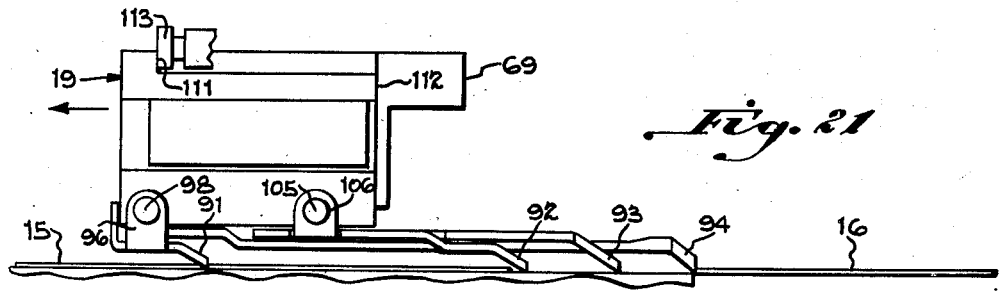
Figure 21 is a semi-diagrammatic side elevational view showing the feed finger carriage at the point in the cycle where the printed ticket has been advanced to the pinning device and the carriage has started to retract.
Figure 22:
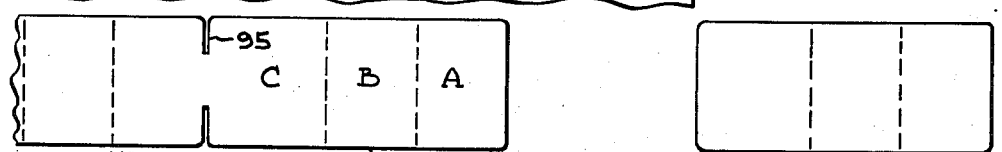
Figure 22 is a top plan view showing the strip and the severed ticket under the conditions of Figure 21.

Referring to Figures 21 and 22, the ticket employed has three parts designated A, B and C respectively. The objective, of course, is to impress successively each one of these three sections with the same set of type mounted in the printing head. In the first part of the cycle the objective is to advance the severed ticket for a distance equal to its full length and also to present section A to the printing platen. Or, otherwise expressed, to move the severed ticket for a distance equal to its length while at the same time moving the succeeding ticket for a distance equal to a little more than one-third its length— and in one forward movement of the feed finger carriage. Immediate engagement of feed finger 94 with the severed ticket (at the very start of the forward movement) and delayed engagement of the feed finger 91 accomplishes the objective. Figures 21 and 22 show the feed finger carriage at the forward end of travel in the first part of the cycle. It will be noted that stop 113 is in position to engage abutment 111. This stop defines the forward limit of travel of the carriage body and as shown in Figure 1 at 122, the stop is threaded into the rocker arm so that its position may be adjusted to insure correct alignment of the tickets. Reference to Figure 13 will show that the cam roller 78 is at a forwardmost point in the cam groove 77. During the advancing movement of the feed finger carriage the ink transfer pad is moved under the printing head and the type is inked. During the retracted movement of the feed finger carriage the printing head descends on the first part or part A of the ticket to print it.

Figure 15:
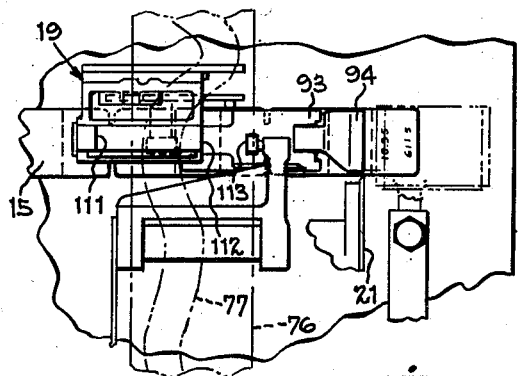
Figure 15 is a view similar to Figure 11 showing the feed finger carriage at the time the first part of the ticket is being impressed with the type which is carried at the printing head.
Figure 16:
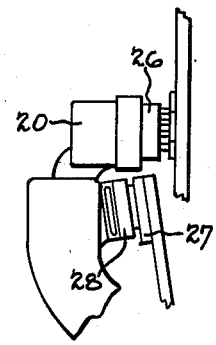
Figure 16 is a view similar to Figure 12 showing the printing head and inking mechanism in the positions of Figure 15.
Figure 17:
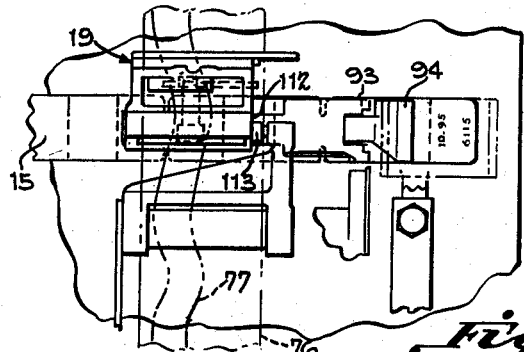
Figure 17 is a view similar to Figure 15 showing the feed finger carriage in a position to advance the second part of the ticket into printing position.
Figure 18:
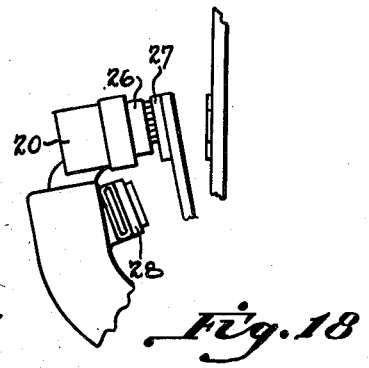
Figure 18 shows the printing head and inking mechanism in the positions of Figure 17.
Figure 23:
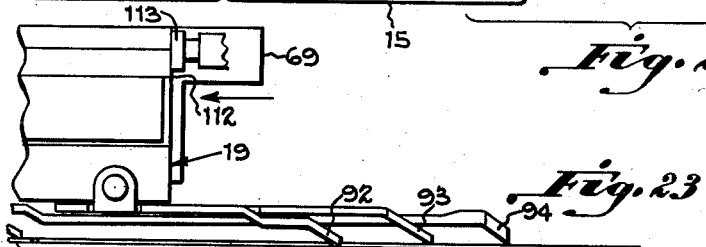
Figure 23 is a side elevational view similar to Figure 21 in which the feed finger carriage has started to retract after advancing the second part of the ticket to printing position.
Figure 24:
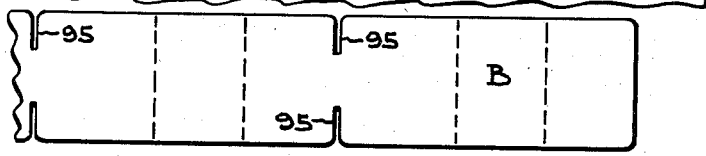
Figure 24 shows the ticket strip under the conditions of Figure 23.
Figure 25:
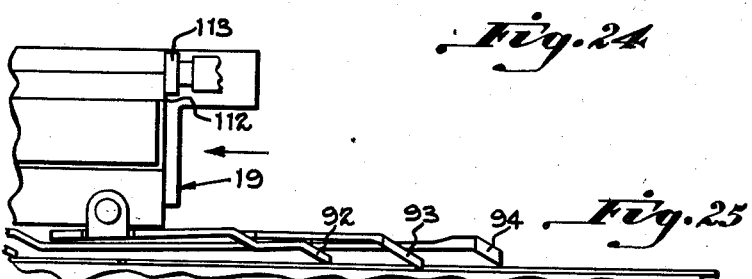
Figure 25 is a view similar to Figure 23 in which the feed finger carriage has started to retract after having advanced the strip into a position for printing the third part of the ticket.

In the retracted position, in the second part of the cycle, the feed finger 92 is in position to engage the notches between the tickets. The advancing movement of the carriage at this time is short and cam 115 is rotated to swing the rocker arm which lowers the stop 113 to a point where it will engage abutment 112 at the front of the feed finger carriage. As before, the type is inked during the advancing movement of the carriage. The forward limit of movement of the tag strip to present section B to the printing head is shown in Figure 23. During the subsequent retracting movement of the feed finger carriage, the printing head descends to print section B. The carriage retracts fully. Upon starting forward, feed finger 93 now engages the notches and the tag is advanced to present section C onto the platen. The printing type is again inked during the advancing movement, the forward limit of which is shown in Figure 25. Again the rocker arm is in position to lower stop 113 into the path of abutment 112. The three-part tag is now advanced or indexed completely. As the printing head comes down for the third time on this ticket the cut-off knife also descends as previously explained, to sever the ticket from the strip. The various positions of the cam 76, the printing head, and the inking mechanism associated with the printing head are shown diagrammatically in Figures 11–20, the first long stroke being shown in Figure 13 and the first of the short strokes in Figures 15, 17 and 19.

The operation disclosed here is for a three-part ticket in which the parts are aligned longitudinally of the strip. It will be appreciated that the addition of feed fingers to the group shown will adapt the machine to a four-part type of operation if this is desired.

Having described our invention, we claim:

1. In a price marking machine adapted to operate upon multi-part tickets, said tickets being provided in strip form with feed finger notches being provided between the individual tickets of the strip and with the parts of each ticket being aligned longitudinally of the strip, said machine having a printing head and a cut-off knife, said cut-off knife being located at the side of the printing head toward which the strip is advanced and adapted to operate at the end of a strip-advancing cycle to sever the lead ticket from the strip, means to advance said strip of tickets through the machine to present the individual parts of each ticket successively to the printing head, said means comprising a reciprocally mounted carriage adapted to move toward and from said printing head, a plurality of feed fingers carried by said carriage, there being one more feed finger than the number of parts in the individual tickets in the strip, said feed fingers being disposed such that at the start of a strip-advancing cycle a lead feed finger is in position to engage a severed ticket beneath the printing head and the rearmost feed finger is resting upon the ticket which follows the one to be operated upon during the cycle and with the intermediate feed fingers in positions to rest upon the ticket to be operated upon, means to drive said carriage such that an advancing motion is imparted to the carriage which is substantially as long as the ticket to be operated upon whereby the severed ticket is advanced for a distance substantially equal to its length and the ticket to be printed is advanced to present the first part thereof to the printing head, said drive means further arranged such that successive advancing movements of the carriage engages the intermediate feed fingers in the order from back to front to present the individual parts of the ticket successively, in stepwise fashion, to the printing head.

2. In a price marking machine adapted to print multi-part tickets, said tickets being provided in strip form with feed finger notches being provided between the individual tickets of the strip and with the parts of each ticket being aligned longitudinally of the strip, said machine having a printing head and a cut-off knife which are adapted to operate simultaneously at the end of a cycle of operation, said cut-off knife being located at the side of the printing head toward which the strip is advanced whereby at the end of a cycle of operation the lead ticket of the strip is severed from the strip, means to advance said strip of tickets through the machine to present the individual parts of each ticket successively to the printing head, said means comprising a reciprocally mounted carriage adapted to move repeatedly toward and from said printing head, a plurality of feed fingers carried by said carriage, said feed fingers being disposed such that at the start of an advancing motion the lead feed finger is in position to engage the severed ticket and the other feed fingers are disposed to successively engage the feed notch at the rear of the following ticket, means to drive said carriage such that a first advancing motion is imparted to the carriage which is substantially as long as the severed ticket, said drive means further arranged such that successive advancing movements of the carriage successively engages the intermediate feed fingers in the order from rear to front to present the individual parts of the ticket successively, in stepwise fashion, to the printing head.

References Cited in the file of this patent

UNITED STATES PATENTS

| | | |
|---|---|---|
| 784,415 | McDonald | Mar. 7, 1905 |
| 1,574,294 | Kohnle | Feb. 23, 1926 |
| 1,897,201 | Laencher | Feb. 14, 1933 |
| 2,125,626 | Flood | Aug. 2, 1938 |
| 2,221,865 | Dauber | Nov. 19, 1940 |
| 2,328,934 | Turner | Sept. 7, 1943 |
| 2,586,563 | Rieger | Feb. 19, 1952 |